(12) United States Patent
Cirkel et al.

(10) Patent No.: US 7,564,506 B2
(45) Date of Patent: Jul. 21, 2009

(54) DISPLAY DEVICE AND METHOD OF MANUFACTURING A DISPLAY DEVICE

(75) Inventors: Peter Albert Cirkel, Eindhoven (NL); Peter Jan Slikkerveer, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 525 days.

(21) Appl. No.: 10/552,970

(22) PCT Filed: Apr. 15, 2004

(86) PCT No.: PCT/IB2004/050455

§ 371 (c)(1), (2), (4) Date: Oct. 13, 2005

(87) PCT Pub. No.: WO2004/092811

PCT Pub. Date: Oct. 28, 2004

(65) Prior Publication Data

US 2006/0192905 A1 Aug. 31, 2006

(30) Foreign Application Priority Data

Apr. 18, 2003 (EP) .................................. 03101085

(51) Int. Cl.
*G02F 1/1343* (2006.01)
*G02F 1/1345* (2006.01)

(52) U.S. Cl. .................... 349/12; 349/139; 349/149; 349/151; 349/187

(58) Field of Classification Search .................... 349/12, 349/23, 33, 139, 149, 150, 151, 152; 345/173, 345/179

See application file for complete search history.

(56) References Cited

U.S. PATENT DOCUMENTS

| 2001/0043291 A1* | 11/2001 | Kono et al. ................... 349/12 |
| 2002/0163601 A1 | 11/2002 | Min et al. |
| 2002/0190964 A1* | 12/2002 | Van Berkel .................. 345/173 |
| 2003/0043317 A1 | 3/2003 | Cirkel et al. |

OTHER PUBLICATIONS

Patent Abstracts of Japan, vol. 2003, No. 02, Feb. 5, 2003.

* cited by examiner

*Primary Examiner*—Dung Nguyen
*Assistant Examiner*—Tai Duong

(57) ABSTRACT

This invention relates to a display device comprising at least a first substrate (4), forming part of a display area (2), and at least one electrically controlled input device (3). According to the invention a first conductor pattern (8) for driving said display area (2) and a second conductor pattern (9) for tansmitting signals from said electrically controlled input 5 device (3) are arranged on said first substrate. The invention also relates to a method for manufacturing such a display device.

7 Claims, 3 Drawing Sheets

DISPLAY DEVICE AND METHOD OF MANUFACTURING A DISPLAY DEVICE

The present invention relates to a display device, comprising a display area and an electrically controlled input device, and to a method of manufacturing such a display device.

Different types of flat display devices are being used more and more in different applications. This includes smaller, handheld devices, such as personal digital assistants (PDAs), cellular telephones and display cards. What is also common to such devices is that they, in addition to a display, include one or more components for inputting information to the device. Such information input components may include a touch pad, buttons or the like. A touch pad detects the position of for example a pointer, and may be used for the input of text or drawings. The touch pad may be arranged on the side of the display, or on top of the display itself. Buttons may be used to activate different menus or to make choices, and also for direct input of information, such as a push-button set on a cellular telephone. Many devices also have a combination of information input components, such as both a touch pad and buttons, which is the case for many PDAs.

When it comes to display devices having a touch pad on top of the display itself, i.e. included in the display area of the device, there are several possible solutions. One alternative is to position a separate touch pad in front of the display. Other alternatives are based on measuring the difference in cell gap in the display area as a result of local pressure by for example a stylus. Yet other alternatives include a stylus-like object including integrated electronics, such as a coil, the position of which can be determined by electronics positioned behind the display.

However, the present arrangements of the display and the information input component or components described above have a number of drawbacks.

First, the connection between the different components, such as the buttons, touch pad and display, may include connectors and flexible foils and may be quite expensive and difficult to manufacture. Moreover, in the case of the touch pad being positioned on top of the display itself, this may further be disadvantageous in that it reduces the apparent optical performance of the display. An alternative solution overcoming the above mentioned problems is therefore desired.

Hence, an object of the present invention is to achieve an improved device and method for integrating a display with information input component, thus overcoming the disadvantages of the prior art described above.

The above and other objects are at least in part achieved by the invention as defined by claim 1. Hence, a display device is arranged comprising at least a first substrate, forming part of a display area, and at least one electrically controlled input device for user input to said display device, wherein a first conductor pattern for driving said display area and a second conductor pattern for transmitting signals from said electrically controlled input device are both arranged on said first substrate.

By arranging both conductor patterns on a single substrate, the input device, for example comprising a touch pad and/or buttons, may be said to be integrated on the same substrate as that used to form the display in the display area itself. This offers a compact, easy-to-manufacture solution and many assembly steps, such as interconnecting the display area and the input device, may be avoided.

Suitably, the at least one electrically controlled input device is arranged for user input of information to said display device. The information may be used to control the display, or may be displayed by the display. Preferably, said first and second conductor patterns are manufactured from the same conductor material, which also facilitates manufacture and avoids any internal connector problems, when transmitting signals from a conductor of one material to a conductor of another material. Suitably, said first and second conductor patterns are manufactured from an essentially transparent conductor material, such as ITO, ensuring proper functioning in the display area of the device.

Moreover, the display device further preferably comprises a second substrate, being positioned in parallel with and on a distance from said first substrate, wherein a layer of electro-optically active material, such as a liquid crystal material, is arranged between said substrates in the display area, and wherein at least one of said substrates are manufactured from a flexible material. The flexibility of one of the substrates enables the distance between the substrates to be altered, due to mechanical pressure on an input device, which alteration is used to enable activation of the button and/or touch pad being pressed.

In another preferred embodiment, a plurality of conducting particles, having a diameter smaller than the distance between said substrates, are arranged between said substrates, in the area of said input device. This enables activation of the input device at a lower applied force. Alternatively, in this case, both substrates may be comparatively rigid. The conducting particles preferably contact the second conductor pattern on the substrate.

In order to further facilitate activation, external structures may be provided, more preferably having a top area larger than the bottom area. Such structures are generally fastened at the outer surface of a substrate.

The objects of this invention are also at least in part achieved by a method for manufacturing a display device as described above, comprising the steps of providing a first substrate, forming a layer of conductive material on an inner surface of said first substrate, and patterning said layer of conductive material in order to generate a display area conductor pattern and an input device conductor pattern on said first substrate.

In the same way as described above, this provides for easy integration of the display and the input device. Suitably, the step of patterning said layer of conductive material comprises the step of making said conductive patterns in a single processing step, for example by means of lithography, which further facilitates manufacturing. The display device further suitably comprises at least one external electrical connection 18 (FIG. 1), for accessing the display device from the outside, wherein a conductive pattern 19 (FIG. 1) for transmitting signals from said external electrical connection is simultaneously formed in the above-mentioned single processing step, which also facilitates manufacturing, and limits the number of connections that need to be made during manufacturing.

The present invention will hereinafter be described in closer detail by means of preferred embodiments thereof, with reference to the accompanying drawings.

Figure 1:
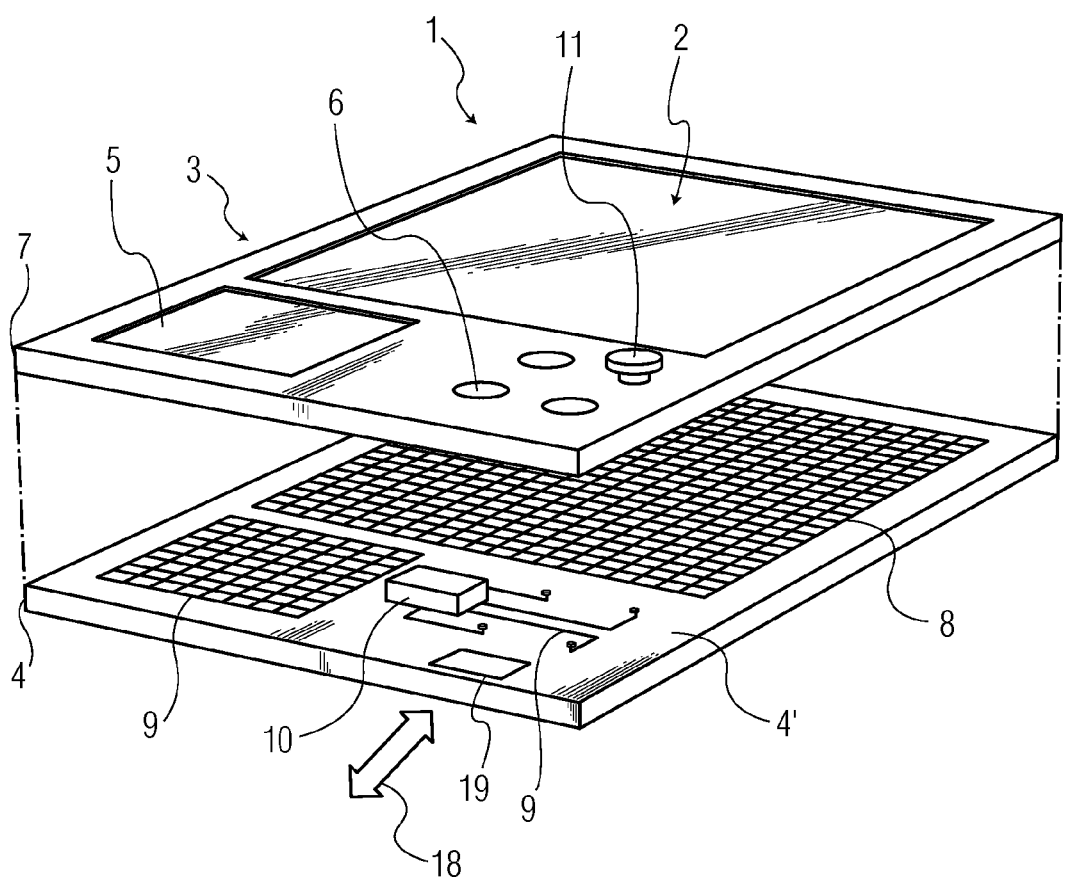
FIG. 1 is a schematic perspective view of an example of a device in which the present invention is implemented.

The present invention proposes an integrated display module, comprising both a display area and some means for information input. Such means may for example be a touch pad or buttons, being arranged to provide a user with the possibility to input information to the display device, which input in some way affects the image to be displayed by the display module. By means of the invention, such an integrated display module may be manufactured in a simple and straightforward manner by applying the conductor pattern for driving the display area, on which the image is to be displayed, and the conductor pattern for the information input means on a single substrate.

A first embodiment of this invention will hereinafter be described with reference to FIG. 1. This first embodiment may for example be realized as a PDA or some other display device. The term "display device" as used herein shall be construed as a device comprising a display. This embodiment discloses a display device 1, having a display area 2 and an electrically controlled input device 3. In the present example, the electrically controlled input device 3 comprises a touch pad 5 and a set of buttons 6, for allowing user input of information to the display device. In this example, the display area 2 and the electrically controlled input device 3 are arranged side by side on the display device 1 and hence do not overlap. Furthermore, the display device 1 comprises two substrates, a first substrate 4 and a second substrate 7, being arranged in parallel with each other and at a small distance from each other. In the display area, the small distance between the first and second substrate 4, 7 is filled with an optically active material, such as a liquid crystal material. In the area of the electrically controlled input device 3, the distance between the substrates 4, 7 may or may not be filled with a material, such as a liquid crystal material. However, in the present example at least one of the substrates 4 or 7 should have sufficient flexibility to be deformed by touch input from a finger, stylus or the like.

According to the invention, the display device 1 also comprises a display area conductor pattern 8, being formed on an inner surface 4' of the first substrate 4, and an input device conductor pattern 9, also being formed on an inner surface 4' of the first substrate 4, said display device being manufactured so that the two conductor patterns 8, 9 are formed essentially simultaneously. The display area conductor pattern 8 is arranged to be used when controlling the display area in order to provide a desired display pattern, and the input device conductor pattern 9 is arranged to transmit input information from the input device 3 to a processor 10 or directly to the display area 2 to be displayed.

The input device conductor pattern 9 is suitably constituted by the same material as that used for the display area conductor pattern 8, for example ITO, being a transparent material suitable for transparent electrodes. The input device conductor pattern 9 and the display area conductor pattern 8 are applied on the inner surface 4' of the first substrate 4 and are patterned in a single lithographic step. Suitably, the conductor patterns 8, 9 are formed by a single material layer formed in a single application step.

Figure 2:
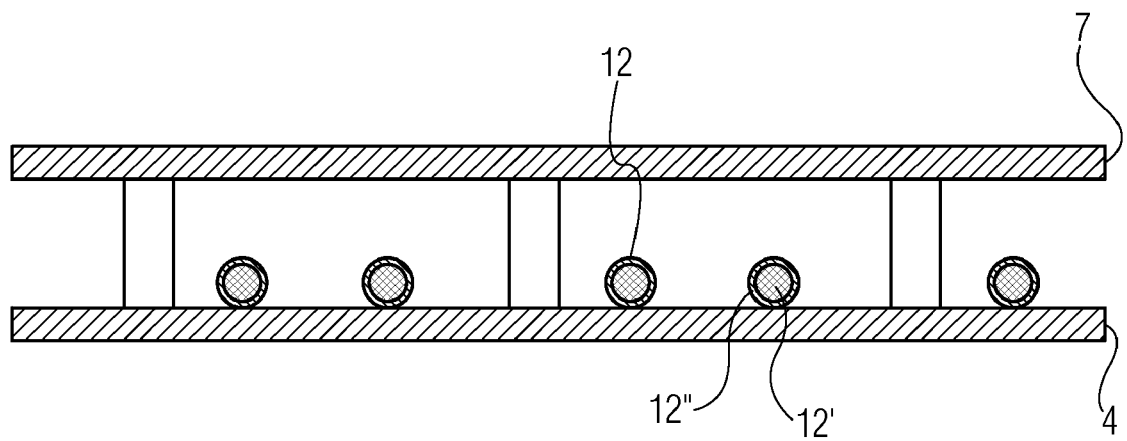
FIG. 2 is a cross-sectional view of an input device area of the present invention.

Regarding the electrically controlled input device 3, it may be embodied so as to be for example a touch pad and/or one or more buttons, as is shown in FIG. 1. In both cases, information input is realized by applying pressure on the selected area constituting the input device 3, so that electrical contact is established between the two substrates. This is made by mechanical movement by the inherent substrates. The electrical contact is induced either by physical contact between the two substrates 4, 7 (as stated above, the substrates 4 or 7 have sufficient flexibility to be deformed by touch input from a finger, stylus or the like) or by an arrangement in which conducting particles 12 are arranged in the space between the two substrates, in the area of the input device. The latter arrangement is disclosed in FIG. 2 and this arrangement is suitable when the substrates to be used are comparatively rigid, since this embodiment limits the deformation of the substrate needed to obtain electrical contact. The conducting particles 12 may for example be in the form of conductive spacers, such as particles 12' covered by a conductive material 12", such as plastic spheres covered with gold.

As is indicated above, the distance between the substrates, in the area of the input device 3, may or may not be filled with a material such as liquid crystal, and in general, the dedicated area for the input device 3 need not be filled with a liquid crystal material, and hence, the display device is subdivided into a first and second cavity, essentially defined by the substrates 4, 7. However, in one embodiment of this invention, it is advantageous to connect the above-mentioned cavities with each other in order to allow a flow of liquid crystal material between the display area 2 and the electrically controlled input device 3. In this context it shall be noted that the term "cavity" as used herein shall be construed as a limited space which may or may not be in contact with the ambient atmosphere.

Figure 4:
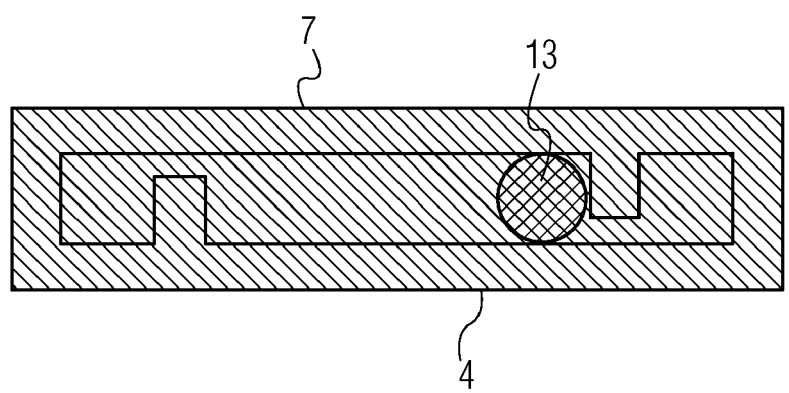
FIG. 4 is a cross-sectional view of a CTLC display in which the present invention may be implemented.
Figure 5:
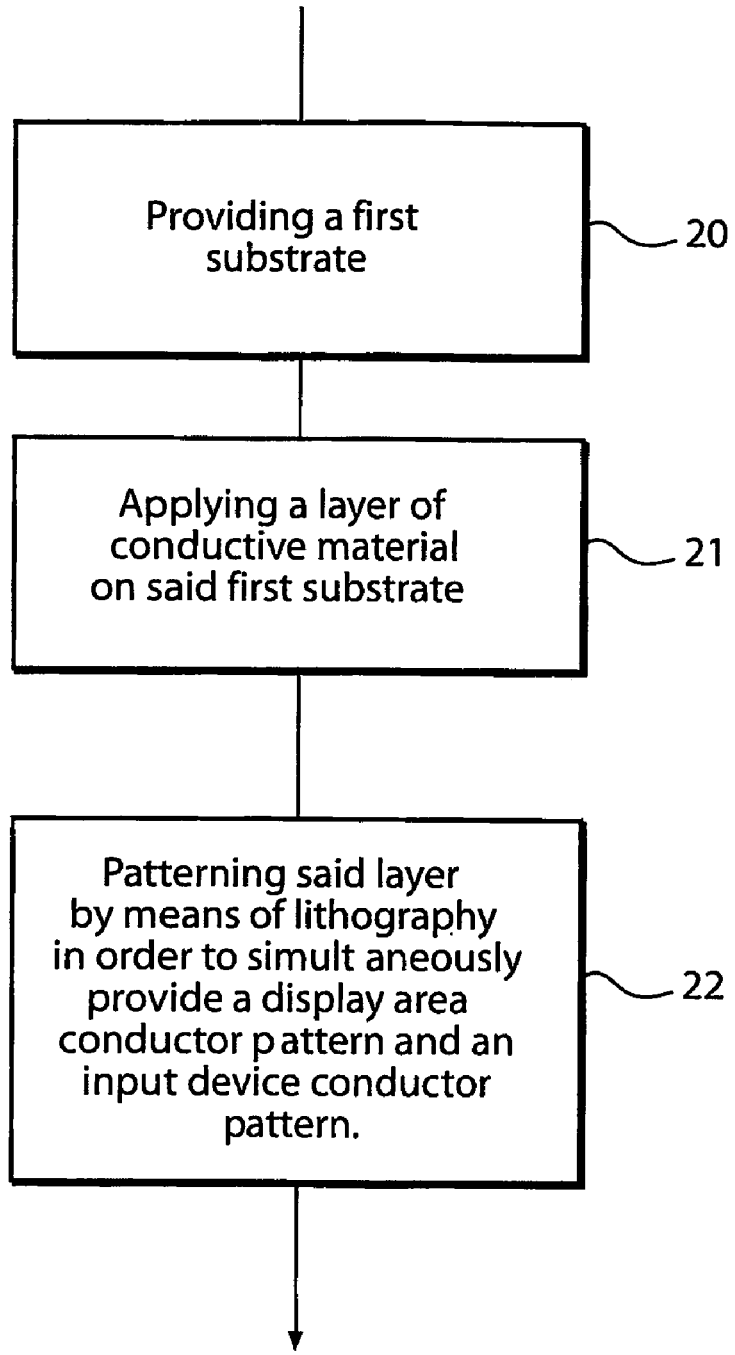
FIG. 5 is flow chart illustrating the basic steps of this invention.

Hence, when a button of the input device 3 is pressed or when a stylus is used to apply pressure on the touch pad of the input device 3, a mechanical movement occurs. This mechanical movement may be used to pump the liquid crystal between the area of the input device and the display area, in order to erase an image on a bi-stable Liquid Crystal Display, such as a Cholesteric Texture Liquid Crystal display (CTLC), before new information is to be written on the display, as initiated by the signal from a button, resulting in said pumping action. The action of a CTLC display is already known, and an example of such a display is disclosed in patent document U.S. 2003/0043317, the contents of which is incorporated into this application, and will therefore not be closer described herein. A schematic drawing of a CTLC display having a display area 2 and two chambers, from which a flow can be induced and which also act as buttons in an input device 3, is further disclosed in FIG. 4.

Figure 3:
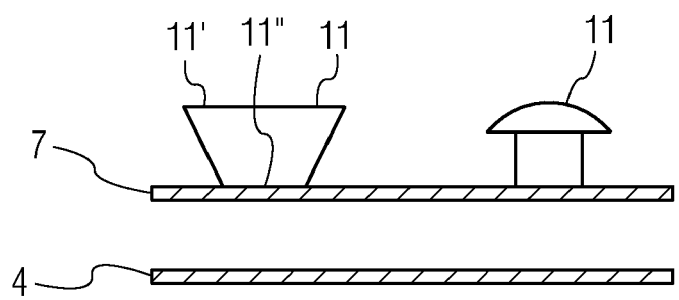
FIG. 3 is a side view of two alternative external structures that may be used to increase the local pressure applied on an input device in accordance with this invention.

Moreover, in order to facilitate activation of a button 6 (FIG. 1) or the like by a user, the local pressure may be increased by an outside structure 11 (FIG. 1), being applied on an outer surface of the substrate 7. This outside structure 11 has a top end 11' and a bottom end 11", and the area of the top end 11' is larger than the area of the bottom end 11", in order to increase the local pressure on the first substrate 7, as applied by a user on the top end 11' of the outside structure 11. Examples of cross-sections of suitable outside structures 11 to be used with this invention are disclosed in FIG. 3.

It is self-evident that the present invention may also be used in display devices in which the input device 3, such as a touch panel, is integrated in the display area 2 itself. A few examples of such display devices are given above.

Alternatively, other conductor patterns 19 (FIG. 1), not primarily connected with the function of the display or the input device, may be formed on the same substrate. For example, a non-closed conductor loop may be incorporated in the periphery of the substrate. This loop may be used as a coil for transferring energy, such as electromagnetic radiation, between the display device and an electrical circuit in an external input device such as a stylus, which may be advantageous in certain applications. Other inductive patterns may also be formed in accordance with the invention.

The invention may also be used to provide conductive surfaces for capacitive coupling for establishing communication between the display device and an electrical circuit in an external input device such as a stylus. Hence, the present invention is advantageous in that a plurality of different components may be integrated onto a single substrate.

A method of manufacturing a display device according to this invention will hereinafter be described. The method comprises the step of providing 20 a first substrate 4. Thereafter a layer of a conducting material, such as ITO, is applied 21 on an inner surface 4' of the first substrate 4. Thereafter, the method comprises the step of patterning said layer, for example by means of lithography, in order to achieve the display area conductor pattern 8 and the input device conductor pattern 9. Thereafter, the manufacturing process continues in a manner known per se, i.e. spacers are provided and a second substrate is arranged on top of the first substrate, a liquid crystal material is introduced at least into the display area of the display device, etc.

A plurality of application embodiments of this invention will hereinafter be described.

According to a first embodiment, the invention is implemented in a plastic CTLC-device, which in turn is implemented in a smart card, and from which information may be erased by the application of a mechanical force on a certain part of the display, as described above. In said certain part of the display, the input device is arranged in the form of a button, and the button is integrated in the following way. Due to the mechanical force which erases the display, the substrates 4, 7 touch each other in this part of the display. In this part, a conduction layer is applied on both substrates 4, 7, i.e. on the surfaces thereof facing each other, such that the applied mechanical force induces electrical contact between the substrates. This electrical contact activates the button, and when the applied mechanical force is removed, the button is deactivated, and thereafter, an electronic circuit may display new information on the display. More in general, the invention as described above may be used to integrate button functions with the display of any display smart card.

According to a second embodiment, the invention is implemented in a PDA. Here, one part of the display device is not filled with liquid crystal. In the part filled with liquid crystal, the display is arranged, and in the part not filled with liquid crystal, a touch panel and a plurality of buttons are integrated by means of the inventive method described above. In the present case, one of the substrates 4, 7 extends beyond the other one, at least in one direction thereof, in order to accommodate an integrated circuit for driving the display, and any additional driving means for the display, being used to detect the user input from the buttons and touch pad and display corresponding results on the display. The integrated driving circuit mentioned above may be connected to the first substrate 4, i.e. the substrate on which the conductor patterns 8, 9 are arranged. This connection may be realized by a chip-on-plastic technique, or by means of a flex foil technique.

According to a third embodiment of the invention, the present invention is implemented in a twisted or super-twisted nematic liquid crystal display device, essentially comprising a first and a second substrate 4, 7 in between which a layer of nematic liquid crystalline material is arranged. The distance between the substrates defines the layer substrates, and this measure may also be referred to as the cell gap of the display device. As described above, conducting particles, being smaller than the cell gap, may be introduced between the substrates. Hence, by pushing on the display, the top substrate may be slightly deformed, so that an electric contact between the top and bottom substrate is achieved. In this embodiment, the conducting particles are distributed in the display area of the display device, and hence the matrix, that is used to control the liquid crystal layer, may also be used to detect the position of the above contact. According to one alternative of this embodiment, the bottom substrate may be a glass substrate, and the top substrate may be a plastic substrate, such as a 120 micron thick polycarbonate film coated with an indium-tin oxide (ITO) transparent conductor pattern according to the invention. The cell gap is maintained at 4.7 microns by means of lithographic spacers, and the conducting particles may have a diameter of 4 microns and may be constituted by plastic beads coated with gold. In a manner known per se, the inner surfaces of the substrates are also coated with conventional alignment layers for liquid crystal alignment. According to a second alternative of this embodiment, both the top and bottom substrate are made from glass, and the cell gap is maintained by plastic beads, having a diameter of 5 micron, and the conducting spacers are plastic beads coated with gold, having a diameter of 4.5 micron.

It should be noted that the above-described embodiments of the invention are not to be construed as limiting the invention, but are rather given as examples of how the present invention may be utilized. A man skilled in the art will be able to design many alternative embodiments of this invention, without departing from the spirit and scope of this invention, as defined by the appended claims.

For instance it shall be noted that the invention is not limited to LCD-displays, but may in fact be used for any substrate-based display device having at least one substrate. However, the invention is especially suited for display devices comprising two substrates, and more in particular to any display which is based on a cell having a certain cell-gap, whereby the display effect is confined between the two substrates. Also, it shall be noted that the invention is equally applicable in cases where the input device is arranged in a dedicated area not coinciding with the display area, and in cases where the areas for the display and the input device partly or fully overlap.

It shall also be noted that the resistance of the material used for the conductor pattern of display areas is normally much smaller than the resistance of the material used for the conductor pattern of touch pads. One reason for choosing a material with a high resistance in the touch pad area is to increase the sensitivity. However, according to the invention, it is advantageous to use the same material in both the display area and the touch pad area. The desired increased resistance may in this case be achieved by patterning the material layer in an appropriate way in order to increase the global resistance. For instance, fine lines will have a high resistance.

The invention claimed is:

1. A display device comprising at least a first substrate, a display area, and at least one electrically controlled input device, characterized in that a first conductor pattern for driving said display area and a second conductor pattern for transmitting signals from said electrically controlled input device are both arranged on said first substrate, wherein the device further comprises a second substrate, being positioned in parallel with and at a distance from said first substrate, at least one of said substrates being manufactured from a flexible material, wherein a layer of an electro-optically active material is arranged between said substrates in the display area, and wherein a plurality of conducting particles, having a diameter smaller than the distance between said substrates, are arranged between said substrates, in the area of said input device.

2. A display device as claimed in claim 1, wherein a conducting particle contacts the second conductor pattern on the substrate.

3. A display device as claimed in claim 1, wherein said first and second conductor patterns are manufactured from the same conductor material.

4. A display device as claimed in claim 1, wherein said first and second conductor patterns are manufactured from an essentially optically transparent conductor material.

5. A method for manufacturing a display device as claimed in claim 1, comprising the steps of:
   providing a first substrate;
   forming a layer of conductive material on an inner surface of said first substrate;
   patterning said layer of conductive material in order to generate a display area conductor pattern and an input device conductor pattern on said first substrate.

6. A method according to claim 5, wherein the step of patterning said layer of conductive material comprises the step of making said conductive patterns in a single processing step, by means of lithography.

7. A method according to claim 6 wherein the display device further comprises at least one external electrical connection, for accessing the display device from the outside, wherein the method further comprises simultaneously forming a conductive pattern for transmitting signals from said external electrical connection in the above-mentioned single processing step.

* * * * *